(12) United States Patent
Madhavan et al.

(10) Patent No.: US 7,705,775 B2
(45) Date of Patent: Apr. 27, 2010

(54) METHOD OF IMPROVING A VEHICLE EMERGENCY CALL NETWORK

(75) Inventors: Sethu K. Madhavan, Canton, MI (US); Eray Yasan, Canton, MI (US); Abhijit D. Patil, Westland, MI (US); Daniel N. Aloi, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 453 days.

(21) Appl. No.: 11/323,502

(22) Filed: Dec. 30, 2005

(65) Prior Publication Data

US 2007/0152877 A1    Jul. 5, 2007

(51) Int. Cl.
*G01S 1/00* (2006.01)
*H04B 1/66* (2006.01)

(52) U.S. Cl. ............... 342/357.02; 342/357.15; 375/240

(58) Field of Classification Search ............ 342/357.02, 342/342.09, 357.09; 455/404.2; 701/200, 701/201, 205, 208
See application file for complete search history.

(56) References Cited

U.S. PATENT DOCUMENTS

| | | | | |
|---|---|---|---|---|
| 4,741,245 A * | 5/1988 | Malone | ...................... | 89/41.03 |
| 4,928,107 A * | 5/1990 | Kuroda et al. | .......... | 342/357.15 |
| 5,365,450 A * | 11/1994 | Schuchman et al. | ....... | 455/456.3 |
| 5,490,073 A * | 2/1996 | Kyrtsos | ....................... | 701/207 |
| 5,999,125 A * | 12/1999 | Kurby | ...................... | 342/357.1 |
| 6,049,303 A * | 4/2000 | Biacs et al. | ............. | 342/357.03 |
| 6,175,801 B1 * | 1/2001 | Millington | .................. | 701/207 |
| 6,282,496 B1 * | 8/2001 | Chowdhary | ................. | 701/220 |
| 6,944,540 B2 * | 9/2005 | King et al. | ................... | 701/213 |
| 7,330,728 B1 * | 2/2008 | Moll et al. | ............... | 455/456.3 |
| 7,391,366 B2 * | 6/2008 | Park et al. | .............. | 342/357.15 |
| 2002/0175855 A1 * | 11/2002 | Richton et al. | ......... | 342/357.02 |
| 2002/0177450 A1 * | 11/2002 | Vayanos | ..................... | 455/456 |
| 2003/0069694 A1 * | 4/2003 | Fuchs et al. | ................. | 701/213 |
| 2004/0192345 A1 * | 9/2004 | Osborn et al. | ............ | 455/456.1 |
| 2004/0198378 A1 * | 10/2004 | Hay | ........................ | 455/456.1 |
| 2005/0125152 A1 * | 6/2005 | Fuchs et al. | ................. | 701/213 |
| 2005/0143916 A1 * | 6/2005 | Kim et al. | .................... | 701/214 |
| 2005/0182530 A1 * | 8/2005 | Murphy | ....................... | 701/16 |
| 2006/0001570 A1 * | 1/2006 | Salas et al. | ............. | 342/357.17 |
| 2006/0114984 A1 * | 6/2006 | Gaal et al. | ................... | 375/240 |
| 2006/0224317 A1 * | 10/2006 | Sarkar | ........................ | 701/213 |
| 2007/0019769 A1 * | 1/2007 | Green et al. | ................ | 375/360 |
| 2007/0109185 A1 * | 5/2007 | Kracke et al. | .......... | 342/357.09 |
| 2007/0135134 A1 * | 6/2007 | Patrick | .................... | 455/456.1 |

FOREIGN PATENT DOCUMENTS

CN    1488955 A    4/2004

* cited by examiner

*Primary Examiner*—Thomas H Tarcza
*Assistant Examiner*—Harry Liu

(57) ABSTRACT

A method of improving a vehicle emergency call network used during an enhanced 911 call, which is especially useful in environments having degraded GPS signals. The present method utilizes an independent position enhancement algorithm, such as a dead reckoning algorithm, and converts the output of that algorithm into a compatible format compatible with a position determining entity (PDE). Some independent position enhancement algorithms return output in the form of position information (typically, two- or three-dimensional coordinates), however, most PDEs only accept information in the form of pseudo-ranges. Thus, the present method provides a technique in which the advantages of an independent position enhancement algorithm are enjoyed, yet a compatible output is sent to the PDE.

13 Claims, 3 Drawing Sheets

METHOD OF IMPROVING A VEHICLE EMERGENCY CALL NETWORK

TECHNICAL FIELD

The present invention generally relates to vehicle GPS devices, and more particularly, to vehicle GPS devices that are used in conjunction with vehicle emergency call networks to provide vehicle position information during an enhanced 911 or E911 call.

BACKGROUND OF THE INVENTION

In recent years, vehicle GPS devices have grown in popularity and are now widely available in a variety of forms, including different types of In-Vehicle Navigation Systems (IVNSs). These systems are primarily based on a Global Positioning System (GPS) which was founded by the U.S. Department of Defense and consists of a constellation of twenty-four satellites working in conjunction with five base stations. The satellites orbit the Earth and transmit precise timing data to GPS receivers located on Earth. If strong signals from three or more satellites are received, then a latitude and longitude (two-dimensional) position can be determined; if strong signals from four or more satellites are received, then a latitude, longitude and altitude (three-dimensional) position can be calculated.

In addition to providing an occupant with navigation-related information, the IVNS can also transmit important vehicle position information during an emergency call. Telecommunication companies have successfully implemented enhanced 911 (E911) services throughout the country, giving the public fast and easy access to a Public Safety Answering Point (PSAP) which is in turn connected to various local emergency responders. E911 systems automatically send certain information such as the caller's location to the PSAP so that it can dispatch emergency services to the caller's location without requiring the possibly panicked caller to convey their location. Traditional land-line telephone systems utilize the telecommunication company's records to lookup an address based upon the caller's phone number. However, this technique does not provide meaningful location information for E911 calls originating from a wireless telecommunication system, such as an IVNS or a mobile phone.

Therefore, in order to enable E911 systems to obtain quick and accurate information during an emergency wireless call, the federal government enacted wireless E911 rules. One of the purposes of the new E911 rules is to enable the PSAP to obtain as much helpful information as possible during an emergency call originating from a wireless INVS; particularly, information relating to the current position of the vehicle.

SUMMARY OF THE INVENTION

According to one aspect of the present invention, there is provided a method for improving a vehicle emergency call network. The method comprises the steps: (a) utilizing an independent position enhancement algorithm to determine enhanced position information, (b) converting the enhanced position information into enhanced pseudo-range information, and (c) sending the enhanced pseudo-range information to a position determining entity (PDE).

In accordance with another aspect of the invention, there is also provided a method for improving a vehicle emergency call network. This method includes the steps of: (a) utilizing a GPS receiver unit to receive GPS information from at least one satellite, (b) utilizing the GPS information and an independent position enhancement algorithm to determine enhanced position information that is generally in the form of coordinates, (c) converting the enhanced position information into enhanced pseudo-range information that has a set of errors purposely inserted therein, and (d) sending the enhanced pseudo-range information to a position determining entity (PDE) in an electronic message that conforms with an IS-801 format.

BRIEF DESCRIPTION OF THE DRAWINGS

A preferred exemplary embodiment of the invention will hereinafter be described in conjunction with the appended drawings, wherein like designations denote like elements, and wherein.

DETAILED DESCRIPTION OF THE PREFERRED EMBODIMENTS

Figure 1:
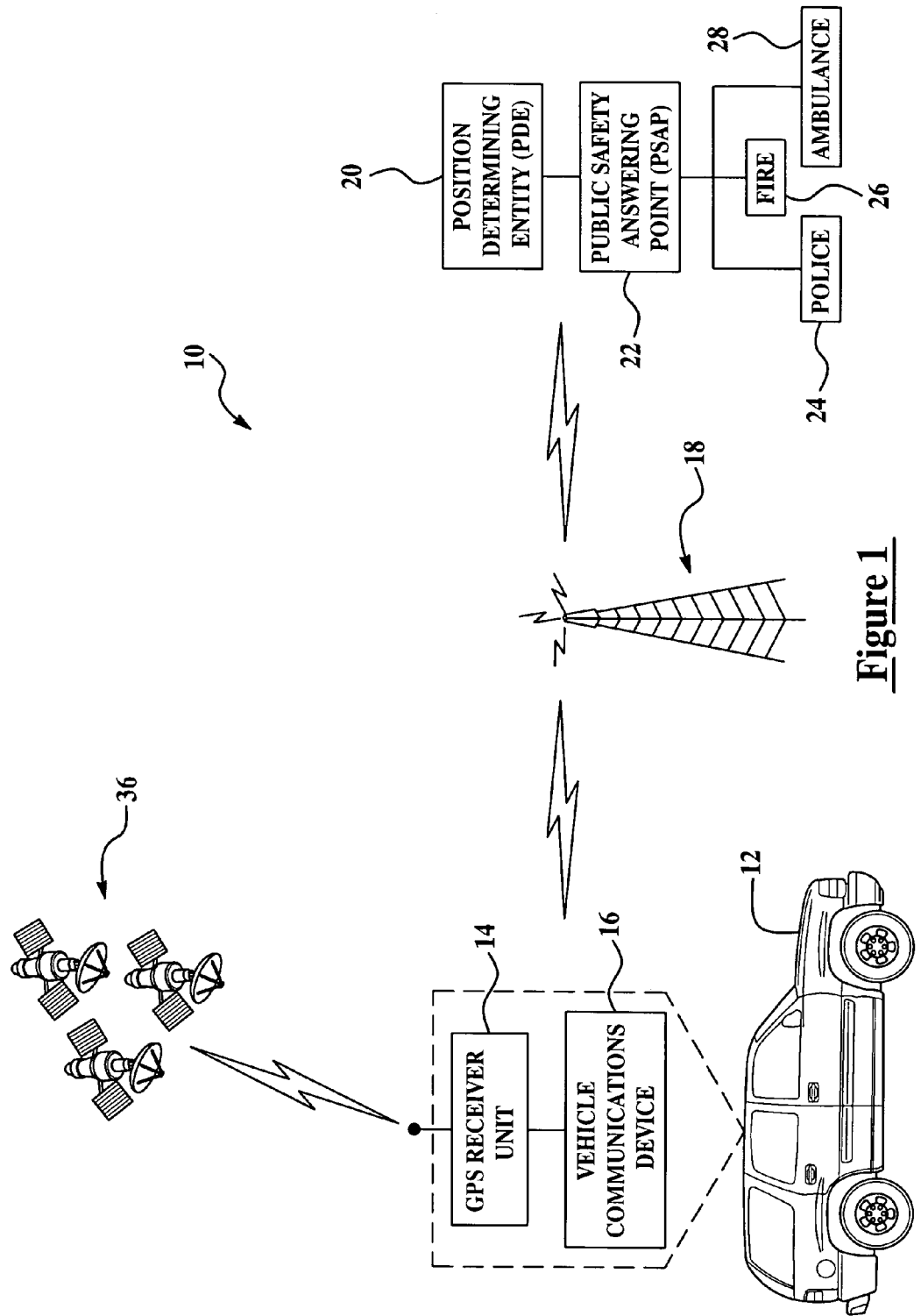
FIG. 1 is a diagram of a known vehicle emergency call network.

With reference to FIG. 1, there is shown an example of a known vehicle emergency call network 10 that receives and processes vehicle position information during an enhanced-911 or E911 emergency call. The vehicle position information enables network 10 to locate a distressed vehicle 12 and to provide emergency responders with the vehicle's location so they can be quickly dispatched to the scene. According to this particular embodiment, vehicle emergency call network 10 generally includes a vehicle navigation device or GPS receiver unit 14, a vehicle communications device 16, a wireless communications network 18, a Position Determining Entity (PDE) 20, a Public Safety Answering Point (PSAP) 22, and one or more emergency responders 24-28. It should be recognized that emergency call networks, such as that shown here, are generally known in the art, thus the following paragraphs simply provide a brief overview of the structure and operation of one exemplary system.

GPS receiver unit 14 acquires GPS information from one or more satellites 36 and can be one of numerous types of devices known in the art, including devices used in telematics-based systems or autonomous systems. A telematics-based vehicle navigation system generally communicates with a system back-end such as a remote call center in order to perform certain navigation related services, while an autonomous vehicle navigation system generally utilizes road data and other information stored locally on a CD or DVD in order to perform similar services. Vehicle communications device 16 is preferably equipped with a wireless modem for data communication via wireless communications network 18, which can be a cellular network. PDE 20 is a hardware component that utilizes the vehicle position information provided by vehicle communications device 16 to locate the position of GPS receiver unit 14 and to relay that position to PSAP 22. Currently, most PDEs only accept information in a pseudo-range format and are thus unable to process other types of information formats. In this particular embodiment, PDE 20 is connected to PSAP 22 via a wired connection, however, the two components could be connected by a wireless connection as well. PSAP 22 is a government controlled call center responsible for answering emergency calls and relaying the request for help to an appropriate emergency responder, such as a local police department 24, fire department 26 or ambulance service 28.

When an emergency E911 call is initiated, GPS receiver unit 14 gathers GPS information from several satellites 36 so that the current location of the vehicle can be determined. Each of the satellites 36 transmits a 'navigation message' that includes a Coarse Acquisition (C/A) code for modulating the carrier signal by spreading it over a 1 MHz bandwidth. The C/A code is a repeating Pseudo Random Noise (PRN) code that uniquely identifies the particular satellite transmitting the message. A complete navigation message includes twenty-five data frames (1500 bits/data frame), each data frame includes five sub-frames (300 bits/sub-frame), and each sub-frame is populated with a different piece of information. From this GPS information, GPS receiver unit 14 is able to generate pseudo-range information for each satellite transmission that it receives. Depending on how the particular emergency call network is setup, the GPS receiver unit can either make error corrections to the pseudo-range information before sending it to the PDE, or it can send uncorrected pseudo-range information knowing that the PDE will subsequently take those errors into account. These corrections typically pertain to errors such as clock synchronization errors, atmospheric transmission delay errors, and Earth rotational errors, to name but a few. The term 'pseudo-range information' is broadly defined as information generally relating to the calculated distance between a particular satellite and the GPS receiver unit, and can either be corrected or uncorrected for errors such as these. Once pseudo-range information is calculated, it is sent to PDE 20 via vehicle communications device 16 and wireless communications network 18.

The PDE then uses the pseudo-range information to determine position information in the form of coordinates (usually two- or three-dimensional coordinates, but not necessarily); the position information corresponds to the place where the pseudo-range information from a number of different satellites intersects. Knowing the position information for GPS receiver unit 14 enables PDE 20 to identify the closest or otherwise most appropriate PSAP 22 for responding to the emergency call. For instance, if GPS receiver unit 14 was located within the territory of a certain PSAP X, instead of alerting all PSAPs (there are over 6,500 in the United States) of the emergency call, only PSAP X would be alerted. PSAP X would then compare the position information to electronically stored road data so that an actual street address, where available, could be generated and provided to the appropriate emergency responders 24-28. With an accurate street address in hand, the emergency responders can quickly and efficiently locate and assist the occupants of vehicle 12.

As previously mentioned, PDE 20 only accepts information from vehicle communications device 16 in a pseudo-range format which, of course, limits the type of information that can be provided to the PDE. If the vehicle communications device were to send the PDE information in a format other than pseudo-ranges, then upgraded hardware and/or software would be needed in order to process this information. System upgrades such as these can be costly and time consuming. Thus, the following paragraphs describe a method that improves vehicle emergency call network 10 by utilizing an independent position enhancement algorithm to provide enhanced output in a non pseudo-range format, yet does so without requiring an upgrade to the PDE.

Method of Improving a Vehicle Emergency Call Network

Figure 2:
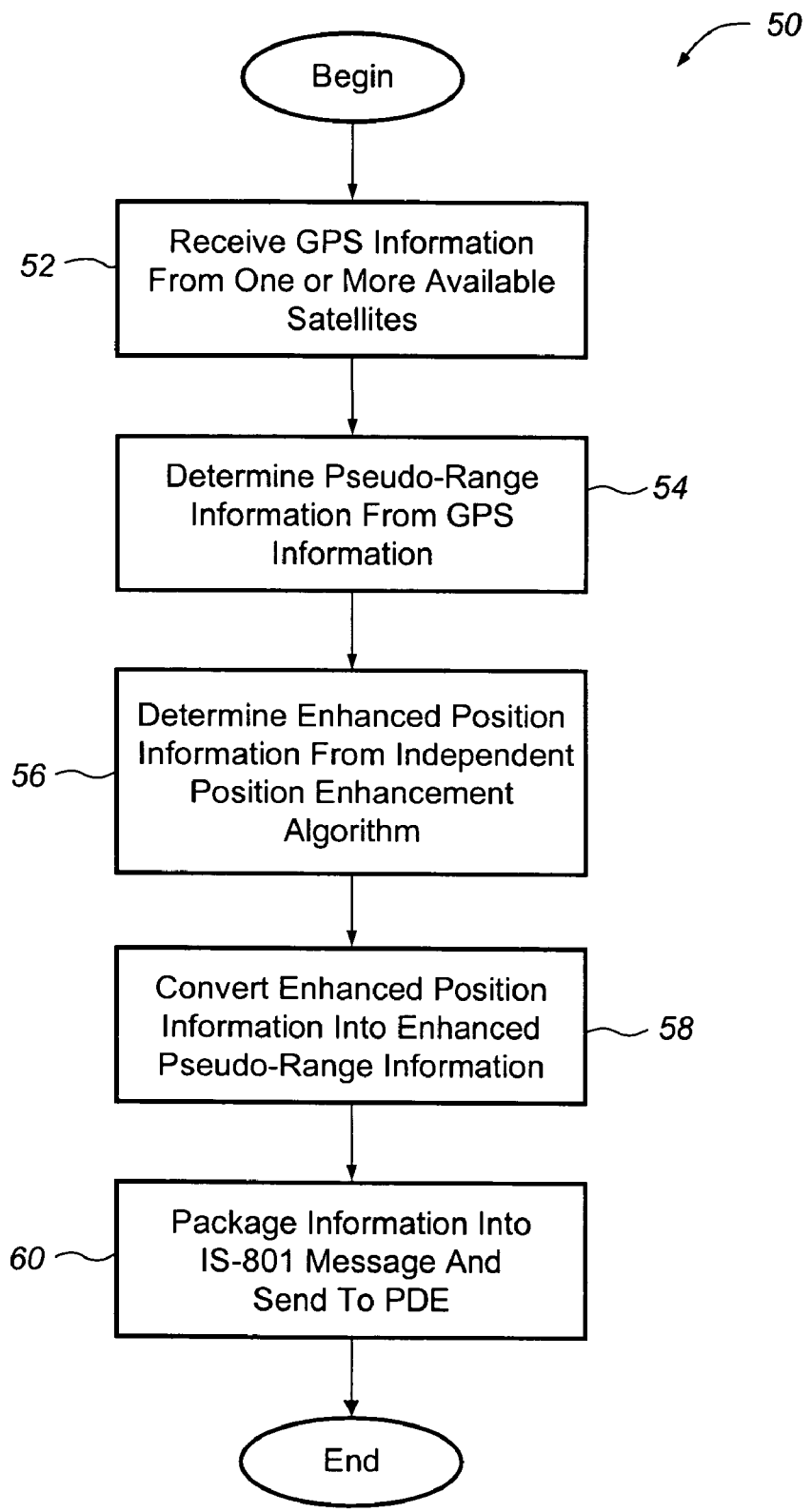
FIG. 2 is a flowchart showing an embodiment of a method for improving a vehicle emergency call network, such as the network shown in FIG. 1.

With reference to FIG. 2, there is shown an embodiment of a method 50 for improving a vehicle emergency call network, such as network 10 just described. Generally, method 50 improves the accuracy and reliability of vehicle position information by employing an independent position enhancement algorithm in conjunction with the GPS information provided by satellites 36. The independent position enhancement algorithm relies upon information generated by a non-GPS device, such as an on-board gyroscope or wheel speed sensor, and is therefore effective even in degraded GPS signal environments. For example, tall buildings (urban canyons), tunnels and other barriers can obscure line-of-sight communication with satellites 36 and thereby inhibit GPS receiver unit 14 from receiving sufficient and accurate GPS information. Although independent position enhancement algorithms can be quite useful in environments such as these, some of these algorithms only provide output in the form of position information (typically, two- or three-dimensional coordinates) while most PDEs can only receive pseudo-range information. Method 50 addresses this issue by providing a technique in which the advantages of the independent position enhancement algorithm are enjoyed, yet a compatible output is sent to PDE 20.

Beginning with step 52, GPS receiver unit 14 preferably receives GPS information from one or more available satellites 36. It should be noted, the term 'GPS information' not only includes information provided by the Global Positioning System which is maintained and operated by the U.S. Department of Defense, but it also includes information provided by other global positioning networks, such as Galileo. In step 54, GPS receiver unit 14 utilizes the GPS information to determine pseudo-range information for each of the transmitting satellites; the pseudo-range information may or may not be corrected for certain errors depending on the particular setup of the emergency call network, as previously explained. The precise manner in which error corrections are made is known in the art and is expressed in the Interface Control Document, which is hereby incorporated in its entirety be reference. ARINC Research Corporation, *Interface Control Document—NAVSTAR GPS Space Segment/Navigation User Interfaces* (Oct. 10, 1993); <http://www.navcen.uscg.gov/pubs/gps/icd200/icd200cw1234.pdf>.

Once pseudo-range information has been generated, step 56 applies an independent position enhancement algorithm to this information in order to generate enhanced position information. Although a number of different independent position enhancement algorithms may be used, one example of a suitable algorithm is the dead reckoning algorithm described in the article Turn, Turn, Turn—Wheel-Speed Dead Reckoning for Vehicle Navigation, which is hereby incorporated by reference. Curtis Hay, *Turn, Turn, Turn—Wheel-Speed Dead Reckoning for Vehicle Navigation*, Curtis Hay, GPS World, pgs. 37-42 (October 2005); http://www.gpsworld.com/gpsworld/data/articlestandard/gpsworld/402005/183484/article.pdf>. The dead reckoning algorithm generally uses a known starting point and independent wheel-speed sensors to measure both the distance traveled by the vehicle and the vehicle's heading. Thus, the position of the vehicle calculated by the dead reckoning algorithm can be used in conjunction with the GPS information so that a more accurate overall location can be calculated. Again, this two-fold approach of using both GPS information and independently derived information from a non-GPS device is particularly useful in environments, such as those mentioned above, where there is insufficient GPS information. As previously mentioned, PDE 20 is only able to receive and process pseudo-range information, thus the enhanced position information outputted by step 56 must be converted.

Figure 3:
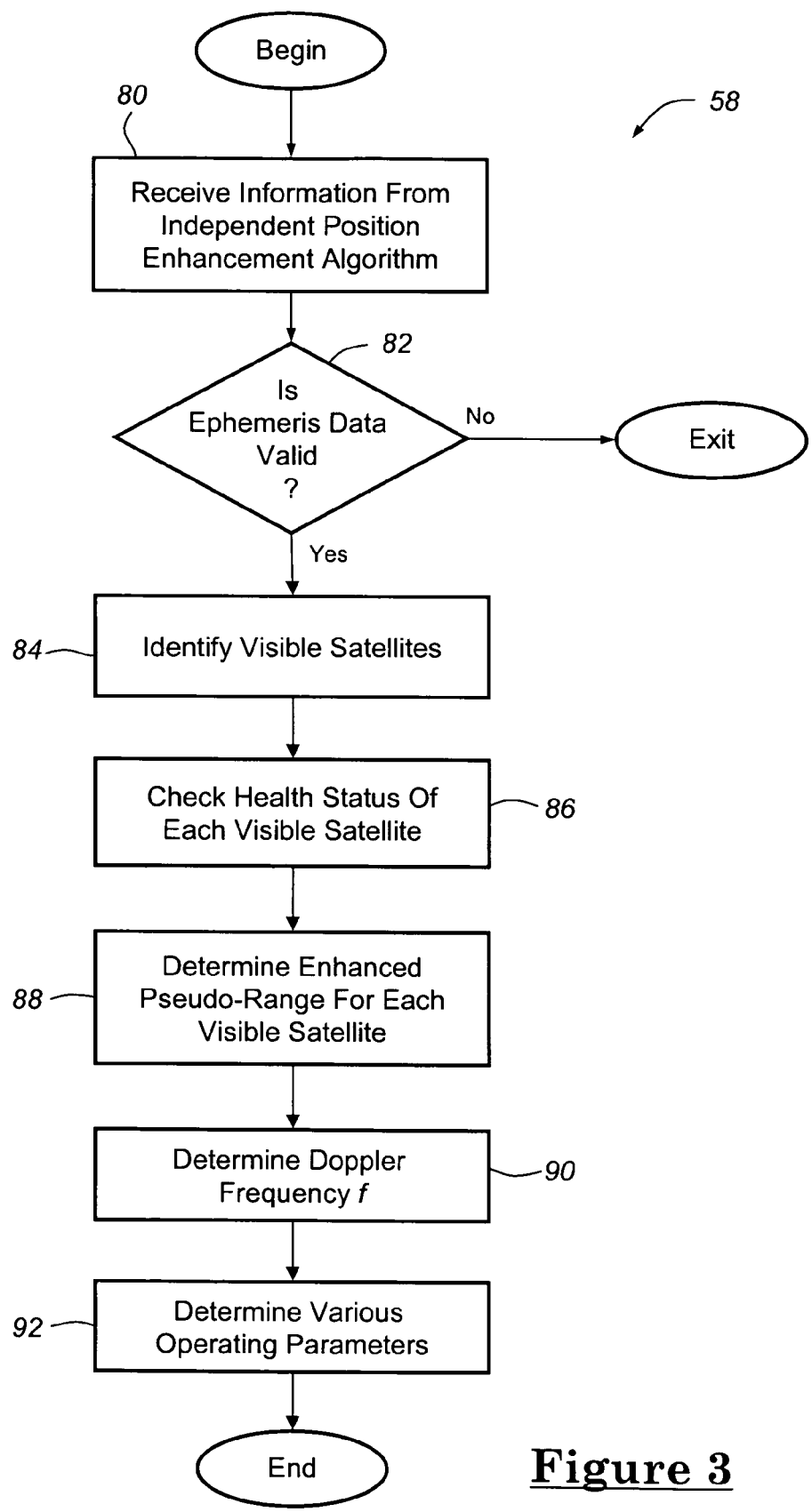
FIG. 3 is a more detailed flowchart showing an embodiment of one of the steps of the method shown in FIG. 2; namely, a step for converting enhanced position information into enhanced pseudo-range information.

Step 58 converts the enhanced position information (typically, two- or three-dimensional coordinates) generated by the independent position enhancement algorithm into enhanced pseudo-range information so that it is compatible with PDE 20. Turning now to FIG. 3, a more detailed flowchart of conversion step 58 is shown. Following execution of the independent position enhancement algorithm, step 80 is provided with the following pieces of information: 1) enhanced position information describing the calculated position of the GPS receiver unit, 2) the GPS receiver unit's two-dimensional velocity (speed and heading), 3) a reference time at which the enhanced position information was determined, and 4) ephemeris data for the various satellites. Preferably, information pieces 1)-3) each come from the independent position enhancement algorithm, while 4) is provided in the GPS information originally sent by satellites 36.

Step 82 determines whether or not the ephemeris data is valid. The ephemeris data describes the particular orbits of each of the satellites 36, and is constantly being updated by the GPS system. Typically, ephemeris data is updated every two to six hours so that slight variations in the orbital behavior of satellites 36 can be taken into account. If the ephemeris data is invalid, then method 50 cannot proceed because there is not enough data available on satellites 36 at the reference time mentioned above; namely, data pertaining to satellite position and clock correction parameters. An example of when the ephemeris data would likely be invalid is when steps 52-56 are executed, but then the vehicle is then turned off for more than, for example, eight hours. When the operator restarts the vehicle and execution of method 50 continues, the ephemeris data would likely be considered outdated and thus invalid. In the event that the ephemeris data is invalid, method 50 would be exited and the process would need to be reinitiated; if the ephemeris data is valid, then the method proceeds to step 84.

Step 84 determines which of the satellites 36 (there are a total of twenty-four in the GPS constellation) would have been visible to GPS receiver unit 14 at the reference time, assuming that nothing was obstructing their transmission (hereafter, referred to as the 'visible satellites'). As previously mentioned, the reference time provided in step 80 is the point in time at which the enhanced position information was determined by the independent position enhancement algorithm. By knowing the ephemeris data for each of the satellites 36, step 84 is generally able to determine where each of those satellites were at the reference time, and more importantly which of those satellites would have been visible to GPS receiver unit 14. Generally, the GPS receiver unit can see between eight to twelve satellites at any one time.

Step 86 checks the health status of each of the visible satellites identified in the previous step. Occasionally, a satellite suffers a malfunction with a thruster or experiences some other technical difficulty which causes the ephemeris data to be inaccurate. In order to alert users of this inaccuracy, the GPS information includes a health status bit that indicates the status of each of the satellites 36. Accordingly, step 86 makes sure that each of the visible satellites has a healthy status.

Step 88 calculates enhanced pseudo-range information for each of the visible satellites based upon the enhanced position information previously determined. Put differently, the independent position enhancement algorithm has already made its best determination as to the location of the vehicle, however, the output is in the form of enhanced position information and PDE 20 only accepts information in pseudo-range format. Thus, step 88 works backwards and calculates an enhanced pseudo-range for each of the visible, healthy satellites; some of which may not have actually transmitted GPS information to GPS receiver unit 14 because of an obstruction in the transmission path. These enhanced pseudo-ranges are calculated so that when PDE 20 processes them, it will arrive at the same enhanced position information previously determined.

In order to calculate an enhanced pseudo-range for a particular satellite, the following formula is utilized:

$$PR^i = c(TOT^i - TOR) + \epsilon^i \qquad (\text{Eqn. 1.0})$$

where, $PR^i$ is the enhanced pseudo-range between the $i^{th}$ satellite and GPS receiver unit 14; c is the speed of light in free space; $TOT^i$ is the time of transmission for the $i^{th}$ satellite; TOR is the time of reception and is set to the reference time provided in step 80; and $\epsilon^i$ is the error due to the Earth's rotation during the time-period between $TOT^i$ and TOR. The speed of light c and the time of reception TOR are both known, and the variables $TOT^i$ and $\epsilon^i$ can be determined from the following equations:

$$TOT^i = c\left(TOR - \frac{R^i(TOR)}{c} - \delta^i\right) \qquad (\text{Eqn. 2.0})$$

where, $R^i$ (TOR) is the range between GPS receiver unit 14 and the $i^{th}$ satellite at the time of reception; and $\delta^i$ is the $i^{th}$ satellite clock offset from GPS system time. It will be appreciated by those skilled in the art, that the variable $R^i$ (TOR) utilizes the enhanced position information previously calculated and that the variable $TOT^i$ is corrected for clock synchronization and atmospheric transmission delay errors.

The error value $\epsilon^i$, which is also referred to as the Sagnac effect, is due to the rotation of the Earth during the time of signal transmission. During the time of that signal transmission, a clock in the vehicle navigation device 14 would experience a finite rotation with respect to the resting reference frame at the Earth's geocenter. The Sagnac effect, $\epsilon^i$, is determined by rotating the vehicle navigation device 14 based on the signal transit time and the Earth's rotational velocity. More thorough information regarding the above-described calculations can be found in *The Interface Control Document*, which is already incorporated by reference.

According to this particular embodiment, step 88 purposely inserts a set of errors (clock synchronization errors, atmospheric transmission delay errors and Earth rotation errors) into the enhanced pseudo-range information. This purposeful error insertion is done in order to offset anticipated error corrections subsequently made by the PDE. Stated differently, method 50 expects PDE 20 to make corrections to the enhanced pseudo-range information for one or more errors, however, since the enhanced pseudo-range information was derived from enhanced position information, these error corrections are unnecessary. Thus, if no error insertions were made, the PDE would attempt to correct non-existent errors and thus inadvertently introduce errors into the otherwise accurate enhanced pseudo-range information. It should be recognized, the errors listed above are simply examples of correctable errors, and method 50 could be designed to correct for a different set of errors other than those described herein. Furthermore, the emergency call network could be provided so that the PDE does not correct for any errors, as mentioned above. In which case, step 88 would not purposely insert errors into the enhanced pseudo-range information because there would be no need to offset subsequent actions taken by the PDE. Once step 88 has determined enhanced pseudo-range information for each of the healthy, visible satellites, the method proceeds to step 90.

In step 90, a Doppler frequency f is determined for each healthy, visible satellite and is based on the relative velocity between the GPS receiver unit 14 (previously provided in step 80) and the transmitting satellite 36. The Doppler frequency f appears positive or negative depending on whether the satellite is moving towards the GPS receiver unit or away from it, and a frequency f of zero appears when the satellite transitions from moving towards unit 14 to moving away from it, or vice-versa. Again, the equations for determining the Doppler frequency f are described in *The Interface Control Document* and are known in the art.

Step 92 determines a number of different operating parameters, some of which are discretionary. For instance, it is oftentimes required to provide a satellite carrier-to-noise ratio which is indicative of the strength of the signal being transmitted by the satellite 36. Typically, this parameter is useful if PDE 20 is utilizing a weighted least squares approach to improve position accuracy, however, it is not pertinent to method 50 because enhanced pseudo-ranges are being produced from a known position and the method is not actually tracking a satellite. Thus, a healthy carrier-to-noise ratio, such as 40 dB-Hz, will be assigned for each of the healthy, visible satellites. Another parameter that may need to be determined is the satellite multi-path indicator, which is usually determined by GPS receiver unit 14. Since method 50 does not rely on measured ranges, this parameter is not applicable and will therefore be assigned a value indicating that it is not available. Lastly, a pseudo-range RMS error is the root mean square error of the pseudo-range measurement for each of the healthy, visible satellites. The range of the RMS error is typically between 0.5 m to 112 m, however, a value of 0.5 m will be assigned for all healthy, visible satellites because no actual measurement is being made. It should be appreciated that other parameters and/or calculations could be made in order to complete step 92, and that one or more of the above-mentioned parameters could be omitted. Once step 92 is completed, the conversion step 60 is finished and control passes to step 62.

Referring back to FIG. 2, step 62 gathers all of the information provided in the previous steps and packages it into a format suitable for sending it to PDE 20. According to a preferred embodiment, the information is packaged into an electronic message that conforms with the IS-801 format, as is appreciated by those skilled in the art, and is sent to PDE 20. Of the various pieces of information populating an IS-801 message, are the enhanced pseudo-ranges previously described. The PDE 20 will then process the IS-801 message and calculate the position of GPS receiver unit 14; a position that corresponds to the enhanced position information previously calculated.

It is to be understood that the foregoing description is not a description of the invention itself, but of one or more preferred exemplary embodiments of the invention. The invention is not limited to the particular embodiment(s) disclosed herein, but rather is defined solely by the claims below. For example, the method of improving a vehicle emergency call network described above could be used with one of a number of other networks and is not specifically limited to the emergency vehicle call network 10 that is shown in FIG. 1. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "for instance" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for improving a vehicle emergency call network, comprising the steps:

(a) utilizing an independent position enhancement algorithm to determine enhanced position information for a vehicle that is in the form of three-dimensional coordinates;

(b) converting said enhanced position information for the vehicle from three-dimensional coordinates to enhanced pseudo-range information that is in the form of pseudo-ranges; and (c) sending said enhanced pseudo-range information to a position determining entity (PDE).

2. The method of claim 1, wherein said independent position enhancement algorithm of step (a) utilizes data provided by at least one of a gyroscope and a wheel speed sensor.

3. The method of claim 2, wherein said independent position enhancement algorithm of step (a) is a dead-reckoning algorithm.

4. The method of claim 1, wherein step (b) further includes determining whether or not ephemeris data is valid.

5. The method of claim 1, wherein step (b) further includes identifying a plurality of visible satellites that would have been visible to a GPS receiver unit at a particular time, assuming that nothing was obstructing their transmission.

6. The method of claim 5, wherein step (b) further includes determining a health status for each of said plurality of visible satellites.

7. The method of claim 1, wherein step (b) further includes purposely inserting a set of errors in said enhanced pseudo-range information in order to offset subsequent error corrections made by said PDE.

8. The method of claim 7, wherein said set of errors includes at least one of the following: i) clock synchronization errors, ii) atmospheric transmission delay errors, and iii) Earth rotational errors.

9. The method of claim 1, wherein said enhanced pseudo-range information of step (c) is sent to said PDE in an electronic message that conforms with an IS-801 format.

10. A method for improving a vehicle emergency call network, comprising the steps of:

(a) utilizing a GPS receiver unit to receive GPS information from at least one satellite;

(b) utilizing said GPS information and an independent position enhancement algorithm to determine enhanced position information for a vehicle that is generally in the form of coordinates;

(c) converting said enhanced position information for the vehicle into enhanced pseudo-range information that has a set of errors purposely inserted therein; and (d) sending said enhanced pseudo-range information with said set of errors to a position determining entity (PDE) in an electronic message that conforms with an IS-801 format.

11. A method for improving a vehicle emergency call network, comprising the steps:
   (a) utilizing an independent position enhancement algorithm to determine enhanced position information for a vehicle that is in the form of three-dimensional coordinates;
   (b) converting said enhanced position information for the vehicle from three-dimensional coordinates to enhanced pseudo-range information that is in the form of pseudo-ranges by utilizing the following equation:

$$PR^i = c(TOT^i - TOR) + \epsilon^i$$

wherein, $PR^i$ is an enhanced pseudo-range; c is the speed of light; $TOT^i$ is a time of transmission; TOR is a time of reception; and $\epsilon^i$ is an error due to the Earth's rotation;
   (c) purposely inserting a set of errors in the enhanced pseudo-range information in order to offset subsequent error corrections made by a position determining entity (PDE), wherein the set of errors includes at least one of the following: i) clock synchronization errors, ii) atmospheric transmission delay errors, and iii) Earth rotational errors; and
   (d) sending said enhanced pseudo-range information to said PDE.

12. The method of claim 11, wherein step (b) further includes utilizing the following equation:

$$TOT^i = c\left(TOR - \frac{R^i(TOR)}{c} - \delta^i\right)$$

wherein, $R^i$ (TOR) is a range between a GPS receiver unit and a satellite; and $\delta^i$ is a clock offset.

13. The method of claim 1, wherein step (b) further includes determining a Doppler frequency f.

* * * * *